(12) United States Patent
Brahmaroutu

(10) Patent No.: US 9,575,786 B2
(45) Date of Patent: Feb. 21, 2017

(54) SYSTEM AND METHOD FOR RAW DEVICE MAPPING IN TRADITIONAL NAS SUBSYSTEMS

(75) Inventor: Surender Brahmaroutu, Round Rock, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 1575 days.

(21) Appl. No.: 12/349,326

(22) Filed: Jan. 6, 2009

(65) Prior Publication Data

US 2010/0175064 A1   Jul. 8, 2010

(51) Int. Cl.
*G06F 9/455* (2006.01)

(52) U.S. Cl.
CPC . *G06F 9/45558* (2013.01); *G06F 2009/45579* (2013.01); *G06F 2009/45595* (2013.01)

(58) Field of Classification Search
CPC .................................................. G06F 9/45558
See application file for complete search history.

(56) References Cited

U.S. PATENT DOCUMENTS

| | | | | |
|---|---|---|---|---|
| 5,452,447 A | * | 9/1995 | Nelson | G06F 12/08 |
| 7,155,558 B1 | * | 12/2006 | Vaghani et al. | 711/4 |
| 7,606,868 B1 | * | 10/2009 | Le et al. | 709/211 |
| 7,784,049 B1 | * | 8/2010 | Gandler | 718/1 |
| 7,865,663 B1 | * | 1/2011 | Nelson et al. | 711/112 |
| 8,555,275 B1 | * | 10/2013 | Gokhale | G06F 9/45558 718/1 |
| 2008/0235479 A1 | * | 9/2008 | Scales et al. | 711/166 |
| 2008/0250222 A1 | * | 10/2008 | Gokhale et al. | 711/203 |

OTHER PUBLICATIONS

VMware Virtual Machine File System: Technical Overview and Best Practices, A VMware Technical White Paper, Version 1.0, 19 pages, 2007.

* cited by examiner

*Primary Examiner* — Jacob A Petranek
(74) *Attorney, Agent, or Firm* — Baker Botts L.L.P.

(57) ABSTRACT

A method is provided for data storage management in a virtualized information handling system that includes a first and second network storage resource, a hypervisor allowing multiple virtual machines to run on the virtualized information handling system, and a data access agent. The data access agent may intercept a data access request initiated by a virtual machine and intended for the first network storage resource. In response to intercepting the data access request, the data access agent may establish a connection with the first network storage resource, and retrieve from the first network storage resource metadata associated with the data access request. The retrieved metadata may identify a location of the second network storage resource. Additionally, the data access may establish a connection with the second network storage resource using the location of the second network storage resource identified by the retrieved metadata. The virtual machine may complete the intercepted data access request via the established connection with the second network storage resource.

20 Claims, 4 Drawing Sheets

SYSTEM AND METHOD FOR RAW DEVICE MAPPING IN TRADITIONAL NAS SUBSYSTEMS

TECHNICAL FIELD

The present disclosure relates in general to virtualized information handling systems, and more particularly to data storage management in virtualized information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increasingly, information handling systems are deployed in architectures that allow multiple operating systems to run on a single information handling system. Labeled "virtualization," this type of information handling system architecture decouples software from hardware and presents a logical view of physical hardware to software. In a virtualized information handling system, a single server can act and behave as multiple, independent servers. Server virtualization is enabled primarily by a piece of software, often called the hypervisor, that sits between the server hardware and the multiple operating systems, also called guest operating systems (guest OS). The hypervisor software provides a container that presents a logical hardware interface to the guest operating systems. An individual guest operating system, along with any applications or other software running on it, thinks it is running on a physical server and is known as a virtual machine.

Often, these architectures are employed for numerous reasons, e.g., (1) increased hardware resource utilization; (2) cost-effective scalability across a common, standards-based infrastructure; (3) workload portability across multiple servers; (4) streamlining of application development by certifying to a common virtual interface rather than multiple implementations of physical hardware; and/or (5) encapsulation of complex configurations into a file that is easily replicated and provisioned.

In many contemporary virtualization architectures, virtual machines are deployed as data stored in computer-readable media (e.g., a file residing on a hard disk drive). In order to manage this data, some virtualization architectures provide a native file system within the hypervisor (e.g., VMware's VMFS file system). In these architectures, the virtual machine data associated with multiple virtual machines may be stored in a single storage device, or in multiple storage devices (e.g., there is a separate storage device dedicated to each virtual machine and its associated data). In either case, the hypervisor-based file system is responsible for managing the access to the data.

Other virtualization architectures do not provide a native file system within the hypervisor. Instead, the virtual machine data in these architectures is stored in a network attached storage (NAS) system and managed by the NAS file system.

However, each of these contemporary approaches to managing data in virtualized information handling systems may have disadvantages. For example, virtualization architectures that include native hypervisor-based file systems may be more complex and more likely to encounter errors due to the added complexity of providing a native file system. In addition, contemporary virtualization architectures that utilize NAS file systems are typically restricted to TCP/IP or UDP/IP based file operations, which may result in additional I/O latencies as the virtual machines attempt to access data.

SUMMARY

In accordance with the teachings of the present disclosure, the disadvantages and problems associated with data storage management in a virtualized information handling system have been substantially reduced or eliminated.

In accordance with one embodiment of the present disclosure, a method is provided for data storage management in a virtualized information handling system that includes a first and second network storage resource, a hypervisor allowing multiple virtual machines to run on the virtualized information handling system, and a data access agent. The data access agent may intercept a data access request initiated by a virtual machine and intended for the first network storage resource. In response to intercepting the data access request, the data access agent may establish a connection with the first network storage resource, and retrieve from the first network storage resource metadata associated with the data access request. The retrieved metadata may identify a location of the second network storage resource. Additionally, the data access may establish a connection with the second network storage resource using the location of the second network storage resource identified by the retrieved metadata. The virtual machine may complete the intercepted data access request via the established connection with the second network storage resource.

In accordance with another embodiment of the present disclosure, an information handling system may include a first and second network storage resource, multiple virtual machines, a hypervisor allowing the multiple virtual machines to run on the information handling system, and a data access agent. The data access agent may be configured to intercept a data access request initiated by a virtual machine and intended for the first network storage resource. In response to intercepting the data access request, the data access agent may be configured to establish a connection with the first network storage resource, and retrieve from the first network storage resource metadata associated with the data access request. The retrieved metadata may identify a location of the second network storage resource, and the data access agent may be further configured to establish a connection with the second storage resource using the location of the second network storage resource identified by the retrieved metadata so that the virtual machine may complete the intercepted data access request via the established connection with the second network storage resource.

A further embodiment of the present disclosure includes a hypervisor allowing multiple virtual machines to run on an information handling system. A particular virtual machine may be associated with a data access agent which may be configured to intercept a data access request initiated by the particular virtual machine and intended for a first network storage resource. In response to intercepting the data access request, the data access agent may be configured to establish a connection with the first network storage resource, and retrieve from the first network storage resource metadata associated with the data access request. The retrieved metadata may identify a location of a second network storage resource, and the data access agent may be further configured to establish a connection with the second storage resource using the location of the second network storage resource identified by the retrieved metadata so that the virtual machine may complete the intercepted data access request via the established connection with the second network storage resource.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
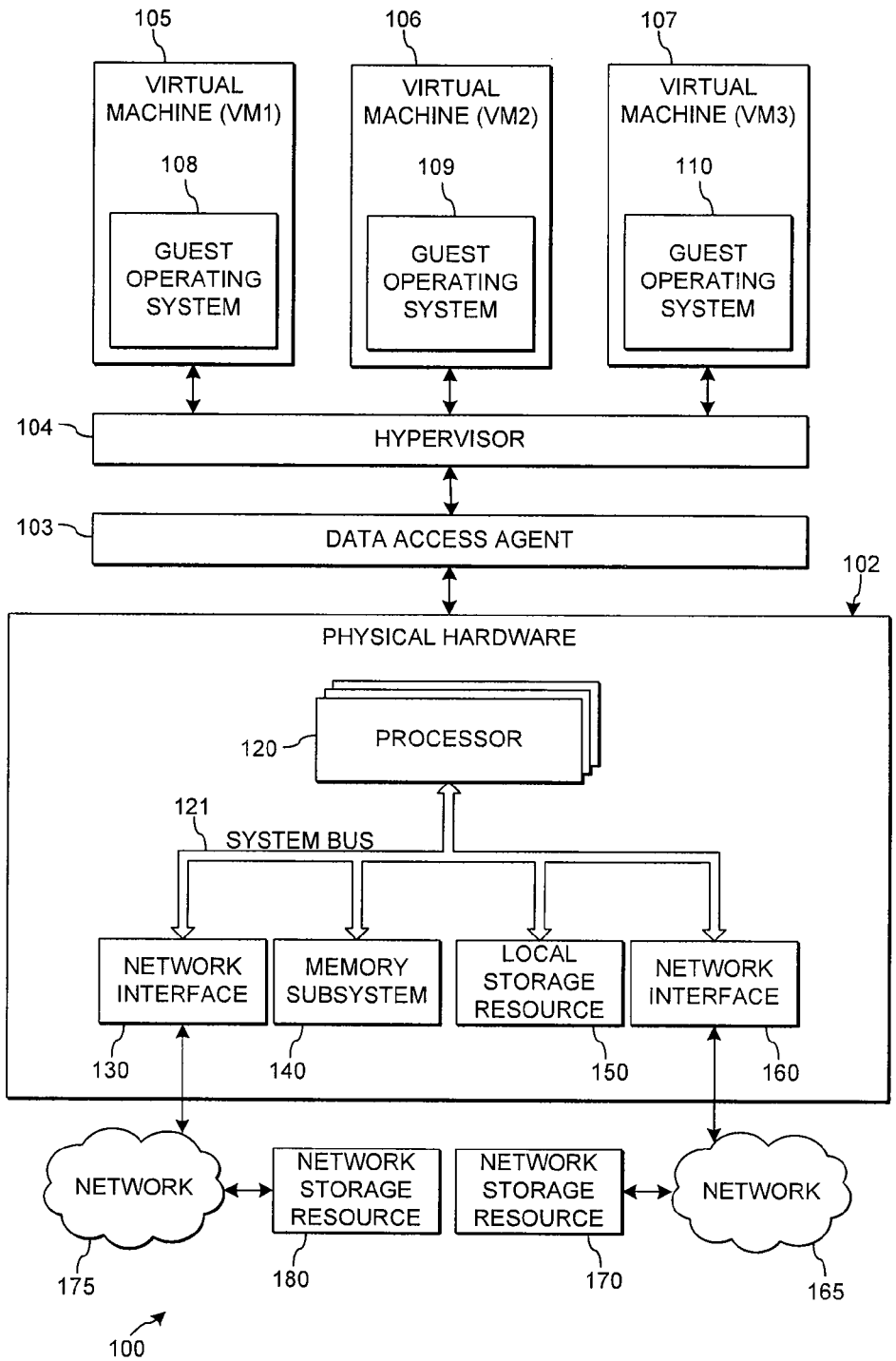
FIG. 1 illustrates a block diagram of an example system for data storage management in a virtualized information handling system, in accordance with the present disclosure.

Preferred embodiments and their advantages are best understood by reference to FIGS. 1-4 wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and/or communicating with, for example, hard drives, network circuitry, memory devices, I/O devices, and other peripheral devices. For example, the hypervisor and/or the data access agent, both described more fully below, may comprise firmware. As used in this disclosure, firmware includes any software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

FIG. 1 illustrates a block diagram of an example system 100 for data storage management in a virtualized information handling system, in accordance with certain embodiments of the present disclosure. As depicted in FIG. 1, system 100 may comprise physical hardware 102, a data access agent 103, a hypervisor 104, and one or more virtual machines 105-107.

Components of physical hardware 102 may include, but are not limited to, one or more processors 120 and a system bus 121 that communicatively couples various system components to processors 120 including, for example, a memory subsystem 140, a local storage resource 150, and network interfaces 130/160. The system bus 121 may be any suitable type of bus structure, e.g., a memory bus, a peripheral bus, or a local bus using any of a variety of bus architectures. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Each of network interfaces 130/160 may be any suitable system, apparatus, or device operable to serve as an interface between information handling system 100 and networks 165/175. Network interfaces 130/160 may enable information handling system 100 to communicate over networks 165/175 using any suitable transmission protocol and/or standard, including without limitation all transmission protocols and/or standards enumerated below with respect to the discussion of networks 165/175.

In some embodiments, network interface 130 may be communicatively coupled via network 175 to network storage resource 180. In the same or alternative embodiments, network interface 160 may be communicatively via network 165 to network storage resource 170. Networks 165/175 may be implemented as, or may be a part of, the same or distinct storage area network (SAN), personal area network (PAN), local area network (LAN), metropolitan area network (MAN), wide area network (WAN), wireless local area network (WLAN), virtual private network (VPN), intranet, the Internet or any other appropriate architecture or system that facilitates the communication of signals, data and/or messages (generally referred to as data). Networks 165/175 may transmit data using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), object-based storage devices (OSD), network file system (NFS), network file system version 4 (NFSv4), and/or any combination thereof. Networks 165/175 and their various components may be implemented using hardware, software, or any combination thereof.

Processors 120 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processors 120 may interpret and/or execute program instructions and/or process data stored locally (e.g., in memory subsystem 140 and/or another component of physical hardware 102). In the same or alternative embodiments, processors 120 may interpret and/or execute program instructions and/or process data stored remotely (e.g., in network storage resource 170).

Memory subsystem 140 may comprise any system, device, or apparatus operable to retain program instructions or data for a period of time (e.g., computer-readable media). Memory subsystem 140 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated information handling system 100 is turned off.

Local storage resource 150 may comprise computer-readable media (e.g., hard disk drive, floppy disk drive, CD-ROM, and/or other type of rotating storage media, flash memory, EEPROM, and/or other type of solid state storage media) and may be generally operable to store data.

Likewise, network storage resources 170/180 may comprise computer-readable media (e.g., hard disk drive, floppy disk drive, CD-ROM, and/or other type of rotating storage media, flash memory, EEPROM, and/or other type of solid state storage media) and may be generally operable to store data. Network storage resources 170/180 may include a plurality of storage resources, and may be operable to perform one or more input and/or output storage operations, and/or may be structured to provide redundancy. IN operation, one or more storage resources disposed in an array of storage resources may appear to an operating system as a single logical storage unit or "logical unit."

Data access agent 103 may comprise any system, device, or apparatus generally operable to intercept data access requests from virtual machines 105-107 of information handling system 100, and to communicate (e.g., establish a connection) with one or more network storage resources (e.g., network storage resources 170/180) in response to intercepting such data access requests. Although depicted as external to physical hardware 102, data access agent 103 may be implemented as hardware within physical hardware 102, firmware running on physical hardware 102 (including, e.g., as a component of hypervisor 104), software running on physical hardware 102 (including, e.g., as a component of hypervisor 104, as a component of virtual machines 105-107, etc.), or any combination thereof. In addition, information handling system 100 may include a data access agent 103 that intercepts data access requests from multiple virtual machines 105-107 (e.g., as depicted in FIG. 1), a separate data access agent 103 for each of the virtual machines 105-107 (e.g., 103*a*/103*b* in FIG. 2), or any combination thereof.

Hypervisor 104 may comprise software and/or firmware generally operable to allow multiple operating systems to run on a single information handling system at the same time. This operability is generally allowed via virtualization, a technique for hiding the physical characteristics of information handling system resources from the way in which other systems, applications, or end users interact with those resources. Hypervisor 104 may be one of a variety of proprietary and/or commercially available virtualization platforms, including without limitation, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP.

In one embodiment, hypervisor 104 may comprise a specially designed operating system (OS) with native virtualization capabilities. In another embodiment, hypervisor 104 may comprise a standard OS with an incorporated virtualization component for performing virtualization.

In another embodiment, hypervisor 104 may comprise a standard OS running alongside a separate virtualization application. In this embodiment, the virtualization application of hypervisor 104 may be an application running above the OS and interacting with physical hardware 102 only through the OS. Alternatively, the virtualization application of hypervisor 104 may, on some levels, interact indirectly with physical hardware 102 via the OS, and, on other levels, interact directly with physical hardware 102 (e.g., similar to the way the OS interacts directly with physical hardware 102, or as firmware running on physical hardware 102). As a further alternative, the virtualization application of hypervisor 104 may, on all levels, interact directly with physical hardware 102 (e.g., similar to the way the OS interacts directly with physical hardware 102, or as firmware running on physical hardware 102) without utilizing the OS, although still interacting with the OS to coordinate use of physical hardware 102.

To allow multiple operating systems to run on information handling system 100 at the same time, hypervisor 104 virtualizes the hardware resources of physical hardware 102 and presents virtualized computer hardware representations to each of virtual machines 105-107. In other words, hypervisor 104 may assign to each of virtual machines 105-107, for example, one or more processors 120, one or more regions of memory in memory subsystem 140, one or more network interfaces 130/160, etc. The virtualized hardware representation presented to each of virtual machines 105-107 may comprise a mutually exclusive, or non-overlapping, set of hardware resources per virtual machine (e.g., no hardware resources are shared between virtual machines) or may comprise an overlapping set of hardware resources per virtual machine (e.g., one or more hardware resources may be shared by two or more virtual machines). Although FIG. 1 illustrates three virtual machines 105-107, information handling system 100 may include any number of virtual machines, and hypervisor 104 virtualizes the hardware resources of physical hardware 102 accordingly.

In one embodiment, hypervisor 104 may assign hardware resources of physical hardware 102 statically (i.e., certain hardware resources are assigned to certain virtual machines, and this assignment does not vary over time). Additionally or alternatively, hypervisor 104 may assign hardware resources of physical hardware 102 dynamically (i.e., the assignment of hardware resources to virtual machines varies over time, for example, in accordance with the specific needs of the applications running on the individual virtual machines). Additionally or alternatively, hypervisor 104 may keep track of the hardware-resource-to-virtual-machine mapping, such that hypervisor 104 is able to determine the virtual machines to which any given hardware resource of physical hardware 102 has been assigned.

Each of virtual machines 105-107 may include a guest operating system (guest OS) 108-110, along with any applications or other software running on guest OS 108-110. Each guest OS 108-110 may be any OS compatible with and/or supported by hypervisor 104 (even if guest OS is generally incompatible with physical hardware 102). In addition, each guest OS 108-110 may be a separate instance of the same operating system or an instance of three different operating systems. For example, in one embodiment, each guest OS 108-110 may comprise a LINUX OS. As another example, guest OS 108 may comprise a LINUX OS, guest OS 109 may comprise a MICROSOFT WINDOWS OS, and guest OS 110 may comprise a VXWORKS OS. Although information handling system 100 is depicted as having three virtual machines 105-107, any number of virtual machines may be running on information handling system 100 at any given time.

In operation, hypervisor 104 of information handling system 100 may virtualize the hardware resources of physical hardware 102 and present virtualized computer hardware representations to each of virtual machines 105-107. Each guest OS 108-110 of virtual machines 105-107 may then begin to operate and run applications and/or other software. While operating, each guest OS 108-110 may utilize one or more hardware resources of physical hardware 102 assigned to the respective virtual machine by hypervisor 104.

When a guest OS 108-110 of virtual machines 105-107 initiates a data access request, data access agent 103 may intercept the request, retrieve metadata associated with the request, and use the retrieved metadata to connect to a storage resource (e.g., network storage resource 170/180) where data for the virtual machine 105-107 making the request is stored. Thus, data access agent 103 may split the data access request into separate control and data paths where control (e.g., metadata) is accessed from one storage resource and data is accessed from another storage resource. For example, control (e.g., metadata) associated with a particular data access request may be stored in network storage resource 180 while the requested data may be stored in network storage resource 170. In this example, a control path may be established when data access agent 103 connects to network storage resource 180 and retrieves from network storage resource 180 metadata associated with the data access request. Similarly, a data path may be established when data access agent 103 connects to storage resource 170 so that the requested data may be accessed.

In one embodiment, metadata is stored in network storage resource 180, which includes a network attached storage file system (e.g., NAS FS). In the same or alternative embodiments, data access agent 103 may establish a control path with network storage resource 180 using the NFSv4 protocol. In the same or alternative embodiments, data access agent 103 may establish a data path with network storage resource 170 using the iSCSI, Fibre Channel, or OSD protocol.

Control or metadata associated with a data access request may include the location of the actual data associated with the request. The location found in the metadata may be an actual network address within information handling system 100, the address of a component within physical hardware 102 of information handling system 100 (e.g., the address of network interface 130), or some other address or address offset that data access agent 103 may use to determine the location of the data associated with the data access request.

The data access agent 103 uses the location found in the metadata to establish the data path (i.e., the connection with the storage resource in which the requested data is stored). In the same or alternative embodiments, control or metadata associated with a data access request may include control information in addition to the location of the actual data associated with the request. For example, the metadata may include information regarding whether data access agent 103 may store or cache the metadata locally (e.g., within memory subsystem 140 or local storage resource 150).

Figure 2:
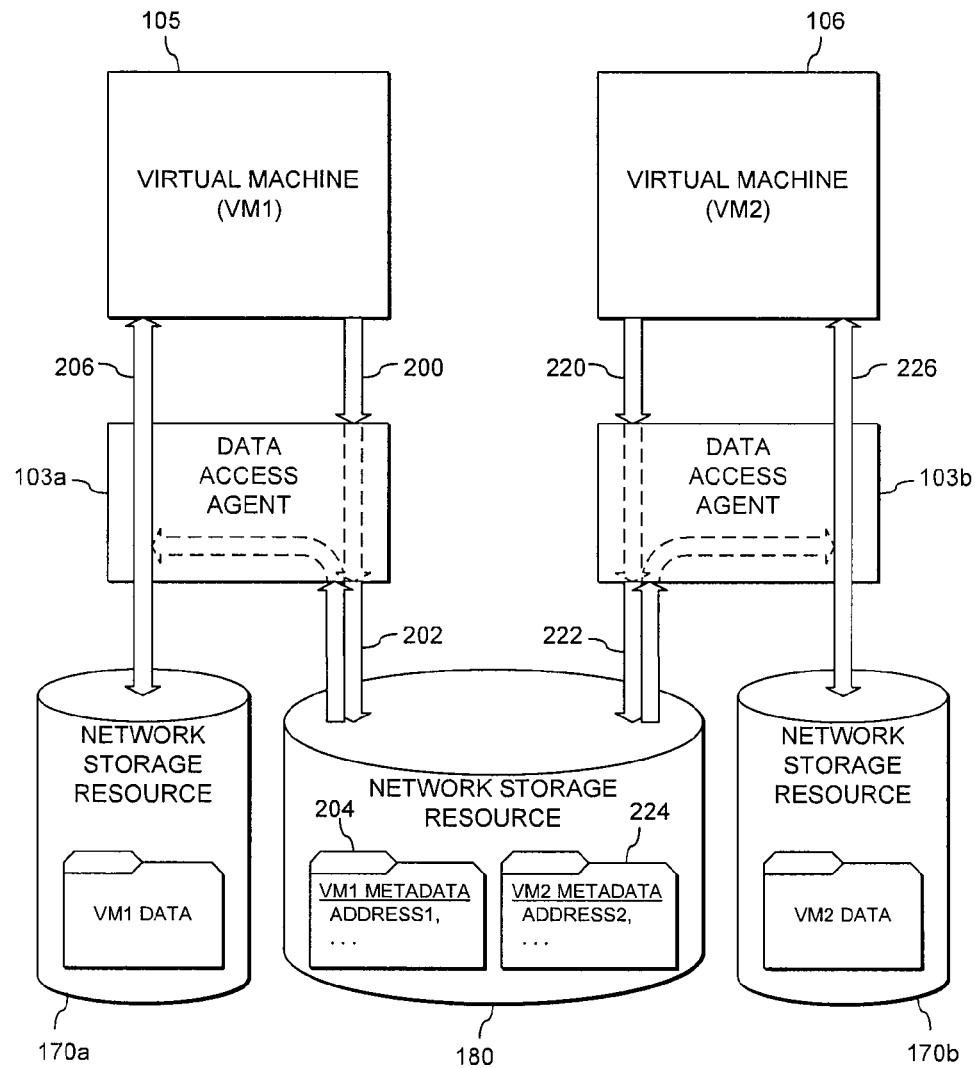
FIG. 2 illustrates a block diagram of certain embodiments of a data access agent facilitating data storage management between virtual machines and network storage resources in a virtualized information handling system, in accordance with certain embodiments of the present disclosure.

FIG. 2 illustrates a block diagram of data access agents 103a and 103b facilitating data storage management between virtual machines 105 and 106, and network storage resources 170 and 190 in a virtualized information handling system 100, in accordance with certain embodiments of the present disclosure. As shown in FIG. 2, information handling system 100 may comprise virtual machines 105-106, data access agents 103a/103b, and network storage resources 170a, 170b, and 180.

In operation, data access agent 103a may be configured to intercept data access requests from virtual machine 105, and data access agent 103b may be configured to intercept data access requests from virtual machine 106. Other embodiments may include a data access agent 103 that intercepts data access requests from multiple virtual machines 105-107 (e.g., as depicted in FIG. 1), a separate data access agent 103 for each of the virtual machines 105-107 (e.g., 103a/103b in FIG. 2), or any combination thereof.

In one embodiment, metadata 204 associated with virtual machine 105 is stored in network storage resource 180 while data associated with virtual machine 105 is stored in network storage resource 170a. Similarly, metadata 224 associated with virtual machine 106 is stored in network storage resource 180 while data associated with virtual machine 106 is stored in network storage resource 107b.

Thus, in the embodiment depicted in FIG. 2, virtual machine 105 may initiate a data access request 200 intended for network storage resource 180. Data access agent 103a may intercept data access request 200, establish connection 202 with network storage resource 180, retrieve metadata 204 associated with data access request 200, and use the retrieved metadata 204 (e.g., ADDRESS1 may correspond to the network address of network storage resource 170a) to establish connection 206 between virtual machine 105 and network storage resource 170a. After the data access agent 103a has established connection 206, virtual machine 105 may access VM1 DATA which is stored in network storage resource 170a and associated with data access request 200.

Similarly, as illustrated in FIG. 2, virtual machine 106 may initiate a data access request 220 intended for network storage resource 180. Data access agent 103b may intercept data access request 220, establish connection 222 with network storage resource 180, retrieve metadata 224 associated with data access request 220, and use the retrieved metadata 224 (e.g., ADDRESS2 may correspond to the network address of network storage resource 170b) to establish connection 226 between virtual machine 106 and network storage resource 170b. After the data access agent 103b has established connection 226, virtual machine 106 may access VM2 DATA which is stored in network storage resource 170b and is associated with data access request 220.

According to the embodiment shown in FIG. 2, metadata 204 and 224 may include the location of the actual data associated with the request (e.g., ADDRESS1 and ADDRESS2, respectively). The location found in metadata 204 and 224 may be an actual network address within information handling system 100, the address of a component within physical hardware 102 (FIG. 1) of information handling system 100 (e.g., the address of network interface 130 shown in FIG. 1), or some other address or address offset that data access agent 103a/103b may use to determine the location of the data associated with data access requests 200 and 220.

Although metadata 204 and 224 are illustrated similarly, metadata associated with a particular virtual machine may comprise a data structure that is different from metadata associated with another virtual machine. In the embodiment depicted in FIG. 2, for example, the data structure of metadata 204 may comprise only location information (e.g., ADDRESS1), whereas the data structure of metadata 224 may comprise location information as well as other control information such as information regarding whether data access agent 103b may store or cache the metadata locally (e.g., within memory subsystem 140 or local storage resource 150, both shown in FIG. 1). Regardless of the metadata's data structure, data access agent 103a/103b, alone or in conjunction with the respective virtual machine 105/106, may be configured to retrieve the metadata 204/224 and to use the control information found therein to complete the pending data access request. In the same or alternative embodiments, data access agent 103a/103b, alone or in conjunction with the respective virtual machine 105/106, may be configured to retrieve the metadata 204/224 and to use the control information found therein to change the state of information handling system 100, for example, to affect future data access requests.

Figure 3:
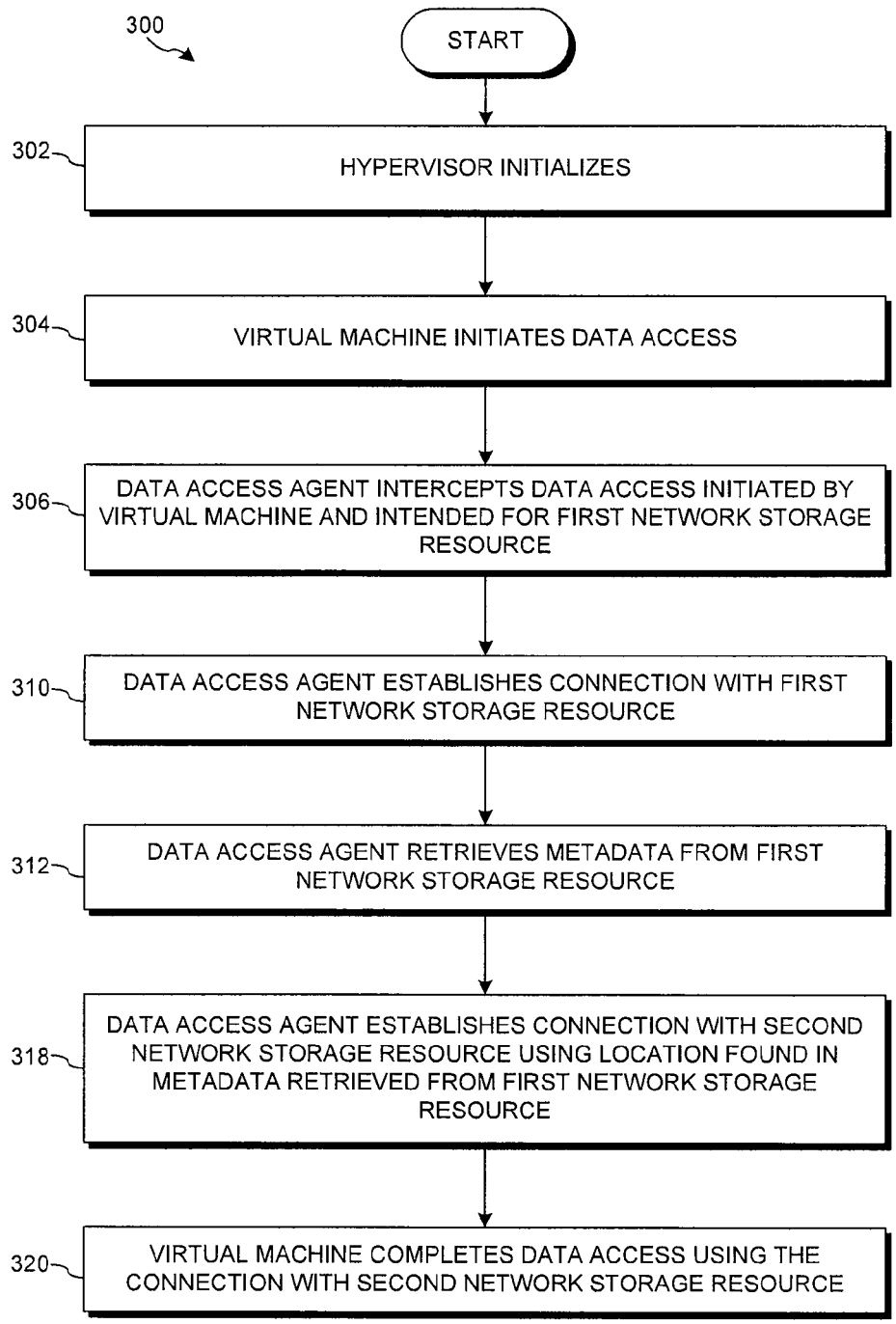
FIG. 3 illustrates a flow chart of an example method for data storage management in a virtualized information handling system including a data access agent and a hypervisor allowing multiple virtual machines to run on the virtualized information handling system, in accordance with certain embodiments of the present disclosure.

FIG. 3 illustrates a flow chart of an example method 300 for data storage management in a virtualized information handling system 100 including a data access agent 103 and a hypervisor 104 allowing multiple virtual machines 105-107 to run on the virtualized information handling system 100, in accordance with certain embodiments of the present disclosure.

According to one embodiment, method 300 preferably begins at step 302. As noted above, teachings of the present disclosure may be implemented in a variety of configurations of system 100. As such, the preferred initialization point for method 300 and the order of the steps 302-320 comprising method 300 may depend on the implementation chosen.

At step 302, information handling system 100 may initialize. For example, information handling system 100 may be powered on, and hypervisor 104 may initiate. At step 304, one of virtual machines 105-107, now operating, may initiate a data access request that is intended for a first network storage resource 180. At step 306, the data access agent 103 may intercept the data access request initiated by the virtual machine. At step 310, and in response to intercepting the data access request, data access agent 103 may establish a connection with the first network storage resource 180.

At step 312, data access agent 103 may retrieve metadata (i.e., control information) from first network storage resource 180. The retrieved metadata may include, among other control information, the location (e.g., a network address) of a second network storage resource 170 in which data associated with the intercepted data access request is stored. Thus, at step 318, data access agent 103 may establish a connection with the second network storage resource 170 using the location (e.g., address) found in the retrieved metadata. At step 320, the virtual machine 105-107 that initiated the data access request may complete the data access using the established connection with the second network storage resource 170.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order. Further, method 300 may be implemented using information handling system 100 or any other system operable to implement method 300. In certain embodiments, method 300 may be implemented partially or fully in software embodied in computer-readable media.

Figure 4:
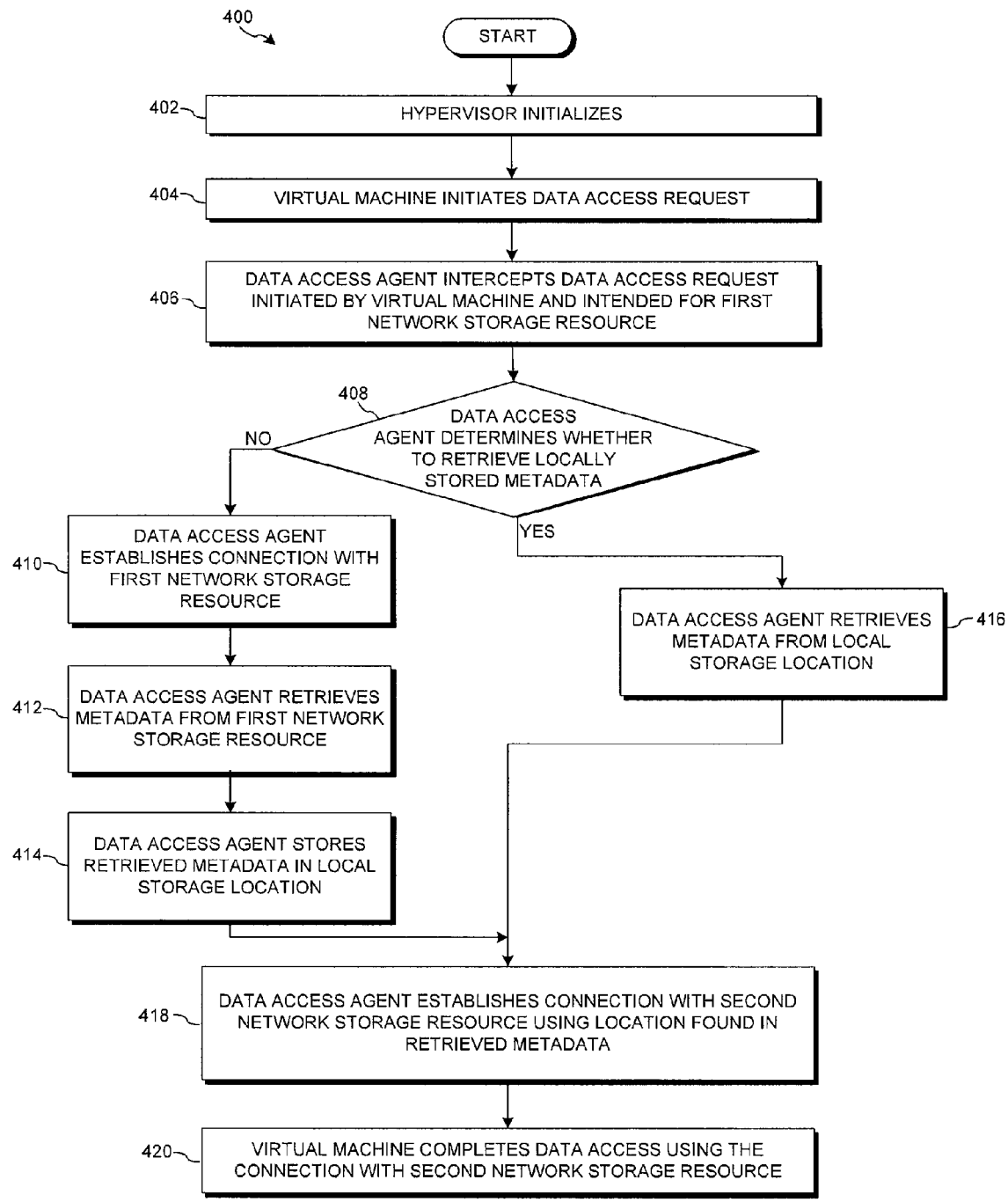
FIG. 4 illustrates a flow chart of an example method for data storage management in a virtualized information handling system including a data access agent utilizing local storage and a hypervisor allowing multiple virtual machines to run on the virtualized information handling system, in accordance with certain embodiments of the present disclosure.

FIG. 4 illustrates a flow chart of an example method 400 for data storage management in a virtualized information handling system 100 including a data access agent 103 utilizing local storage (e.g., memory subsystem 140 and/or local storage resource 150) and a hypervisor 104 allowing multiple virtual machines to run on the virtualized information handling system 100, in accordance with certain embodiments of the present disclosure.

According to one embodiment, method 400 preferably begins at step 402. As noted above, teachings of the present disclosure may be implemented in a variety of configurations of system 100. As such, the preferred initialization point for method 400 and the order of the steps 402-420 comprising method 400 may depend on the implementation chosen.

At step 402, information handling system 100 may initialize. For example, information handling system 100 may be powered on, and hypervisor 104 may initiate. At step 404, one of virtual machines 105-107, now operating, may initiate a data access request that is intended for a first network storage resource 180. At step 406, the data access agent 103 may intercept the data access request initiated by the virtual machine. At step 408, data access agent 103 may determine whether to retrieve locally stored metadata that is associated with the intercepted data access request. For example, in some embodiments, data access agent 103 may store or cache retrieved metadata locally (e.g., within memory subsystem 140 or local storage resource 150) for each data access request it intercepts so that subsequent data access requests for the same data (e.g., a subsequent request that would result in the data access agent 103 retrieving the same metadata from local storage resource 180) may be performed without the need to retrieve the metadata from network storage resource 180.

If the data access agent 103 determines in step 408 that the metadata associated with the intercepted data access request may be retrieved from local storage, the method continues with step 416 where the data access agent 103 may retrieve the metadata from the local storage location (e.g., from memory subsystem 140 or local storage resource 150). If the data access agent 103 determines in step 408 that metadata associated with the intercepted data cannot be retrieved from local storage, the method proceeds to step 410

At step 410, and in response to intercepting the data access request, data access agent 103 may establish a connection with the first network storage resource 180. At step 412, data access agent 103 may retrieve metadata (i.e., control information) from first network storage resource 180. The retrieved metadata may include, among other control information, the location (e.g., a network address) of a second network storage resource 170 in which data associated with the intercepted data access request is stored. In the same of alternative embodiments, the retrieved metadata may include information regarding whether data access agent 103 may store or cache the retrieved metadata locally (e.g., within memory subsystem 140 or local storage resource 150). As depicted in step 414 of FIG. 4, data access agent 103 may store the retrieved metadata in a local storage location. As discussed previously, data access agent 103 may perform step 414 in response to specific control information located within the retrieved metadata. In the same or alternative embodiments, data access agent 103 may be configured to perform step 414 following each metadata retrieval from the first network storage resource 180.

Whether the access agent 103 retrieved the metadata associated with the data access request from local storage (i.e., in step 416), or from the first network storage resource 180 (i.e., in steps 410-414), the data access agent 103 may now proceed to step 418. In this step, data access agent 103 may establish a connection with the second network storage resource 170 using the location (e.g., address) found in the retrieved metadata. At step 420, the virtual machine 105-107 that initiated the data access request may complete the data access using the established connection with the second network storage resource 170.

Although FIG. 4 discloses a particular number of steps to be taken with respect to method 400, method 400 may be executed with greater or fewer steps than those depicted in FIG. 4. For example, data access agent 103 may not perform step 414 where retrieved metadata indicates that the metadata should not be stored or cached locally. In addition, although FIG. 4 discloses a certain order of steps to be taken with respect to method 400, the steps comprising method 400 may be completed in any suitable order. Further, method 400 may be implemented using information handling system 100 or any other system operable to implement method 400. In certain embodiments, method 400 may be implemented partially or fully in software embodied in computer-readable media.

Using the methods and systems disclosed herein, problems associated with conventional approaches to data storage management in a virtualized information handling system may be improved, reduced, or eliminated.

Although the present disclosure has been described in detail, it should be understood that various changes, substitutions, and alterations can be made hereto without departing from the spirit and the scope of the disclosure as defined by the appended claims.

What is claimed is:

1. A method for data storage management in a virtualized information handling system including a first and second network storage resource, a hypervisor allowing multiple virtual machines to run on the virtualized information handling system, and a data access agent, the method comprising:
   the data access agent intercepting a data access request initiated by a virtual machine and intended for the first network storage resource;
   in response to intercepting the data access request, the data access agent establishing a connection with the first network storage resource;
   the data access agent retrieving from the first network storage resource metadata associated with the data access request, the metadata includes an address offset identifying a location of the second network storage resource and control information for determining whether the data access agent can store the metadata locally;
   the data access agent establishing a connection with the second network storage resource using the location of the second network storage resource identified by the retrieved metadata; and
   the virtual machine completing the intercepted data access request via the established connection with the second network storage resource.

2. A method according to claim 1, wherein the connection with the first network storage resource comprises the NFSv4 protocol.

3. A method according to claim 2, wherein the data access agent retrieves the metadata associated with the data access request by sending a packet to the first network storage resource, the packet comprising:
   a source address associated with the virtual machine; and
   a destination address associated with the first network storage resource.

4. A method according to claim 1, wherein the connection with the second network storage resource comprises one of: iSCSI protocol, Fibre Channel (FC) protocol, and object-based storage devices (OSD) protocol.

5. A method according to claim 1, further comprising the data access agent storing the retrieved metadata locally such that the data access agent need not retrieve the metadata from the first network storage resource in response to subsequent data access requests.

6. A method according to claim 1, wherein the retrieved metadata comprises a raw disk map (RDM) file.

7. A method according to claim 1, wherein the virtualized information handling system includes a second virtual machine, a second data access agent, and a third network storage resource, the method further comprising:
   the second data access agent intercepting a second data access request initiated by the second virtual machine;
   in response to intercepting the second data access request, the second data access agent establishing a connection with the first network storage resource;

the second data access agent retrieving from the first network storage resource a second metadata associated with the second data access request, the metadata includes an address offset identifying a location of the third network storage resource and control information for determining whether the data access agent can store the metadata locally;

the second data access agent establishing a connection with the third network storage resource using the location of the third network storage resource identified by the retrieved metadata; and the second virtual machine completing the intercepted second data access request via the established connection with the third network storage resource.

8. An information handling system, comprising:
a first and second network storage resource;
multiple virtual machines;
a hypervisor allowing the multiple virtual machines to run on the information handling system; and
a data access agent configured to:
   intercept a data access request initiated by a virtual machine and intended for the first network storage resource;
   in response to intercepting the data access request, establish a connection with the first network storage resource;
   retrieve from the first network storage resource metadata associated with the data access request, the metadata includes an address offset identifying a location of the second network storage resource and control information for determining whether the data access agent can store the metadata locally; and
   establish a connection with the second storage resource using the location of the second network storage resource identified by the retrieved metadata, so that the virtual machine may complete the intercepted data access request via the established connection.

9. An information handling system according to claim 8, wherein the connection with the first network storage resource comprises the NFSv4 protocol.

10. An information handling system according to claim 9, wherein the data access agent retrieves the metadata associated with the data access request by sending a packet to the first network storage resource, the packet comprising:
   a source address associated with the virtual machine; and
   a destination address associated with the first network storage resource.

11. An information handling system according to claim 8, wherein the connection with the second network storage resource comprises one of: iSCSI protocol, Fibre Channel (FC) protocol, and object-based storage devices (OSD) protocol.

12. An information handling system according to claim 8, further comprising the data access agent storing the retrieved metadata locally such that the data access agent need not retrieve the metadata from the first network storage resource in response to subsequent data access requests.

13. An information handling system according to claim 8, wherein the retrieved metadata comprises a raw disk map (RDM) file.

14. An information handling system according to claim 8, further comprising:
   a second virtual machine; and
   a third network storage resource; and
   a second data access agent configured to:
      intercept a second data access request initiated by the second virtual machine;
      in response to intercepting the second data access request, establish a connection with the first network storage resource;
      retrieve from the first network storage resource metadata associated with the second data access request, the metadata includes an address offset identifying a location of the third network storage resource and control information for determining whether the data access agent can store the metadata locally; and
      establish a connection with the third network storage resource using the location of the third network storage resource identified by the retrieved metadata, so that the second virtual machine may complete the intercepted second data access request via the established connection with the third network storage resource.

15. A hypervisor allowing multiple virtual machines to run on an information handling system, a particular virtual machine associated with a data access agent configured to:
   intercept a data access request initiated by the particular virtual machine and intended for a first network storage resource;
   in response to intercepting the data access request, establish a connection with the first network storage resource;
   retrieve from the first network storage resource metadata associated with the data access request, the metadata includes an address offset identifying a location of the second network storage resource and control information for determining whether the data access agent can store the metadata locally; and
   establish a connection with the second network storage resource using the location of the second network storage resource identified by the retrieved metadata, so that the particular virtual machine may complete the intercepted data access request via the established connection.

16. A hypervisor according to claim 15, wherein the connection with the first network storage resource comprises the NFSv4 protocol.

17. A hypervisor according to claim 16, wherein the data access agent retrieves the metadata associated with the data access request by sending a packet to the first network storage resource, the packet comprising:
   a source address associated with the particular virtual machine; and
   a destination address associated with the first network storage resource.

18. A hypervisor according to claim 15, wherein the connection with the second network storage resource comprises one of: iSCSI protocol, Fibre Channel (FC) protocol, and object-based storage devices (OSD) protocol.

19. A hypervisor according to claim 15, further comprising the data access agent storing the retrieved metadata locally such that the data access agent need not retrieve the metadata from the first network storage resource in response to subsequent data access requests.

20. A hypervisor according to claim 15, wherein the retrieved metadata comprises a raw disk map (RDM) file.

* * * * *